O. GUTHRIE.
FACILITATING THE CONGELATION OF WATER, &c.
No. 10,283. Reissued Feb. 6, 1883.
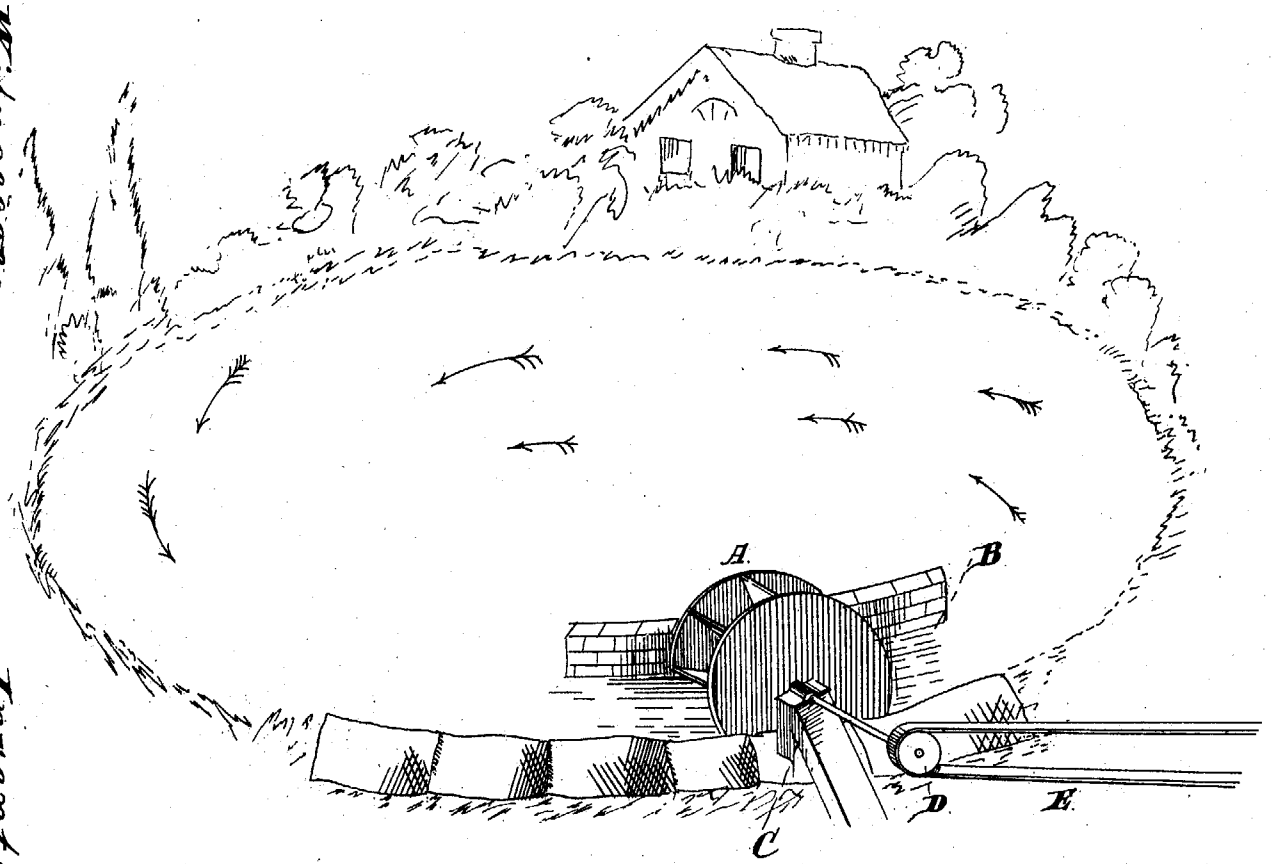
Witnesses:
Albert H. Adams.
Edgar T. Bond.
Inventor:
Ossian Guthrie
by West & Bond
Attys
N. PETERS, Photo-Lithographer, Washington, D. C.

UNITED STATES PATENT OFFICE.

OSSIAN GUTHRIE, OF CHICAGO, ILLINOIS.

FACILITATING THE CONGELATION OF WATER, &c.

SPECIFICATION forming part of Reissued Letters Patent No. 10,283, dated February 6, 1883.

Original No. 250,235, dated November 29, 1881. Application for reissue filed January 15, 1883.

*To all whom it may concern:*

Be it known that I, OSSIAN GUTHRIE, a citizen of the United States, residing in the city of Chicago, in the county of Cook and State of Illinois, have invented certain new and useful improvements for facilitating the congelation of water in the formation of ice and freeing it from gas or air bubbles generally existing in ice formed in ponds or lakes of still water; and I do hereby declare that the following is a full, clear, and exact description of my invention, which will enable others skilled in the art to which it appertains to make and use the same.

I have discovered and well authenticated the fact that water in a perfectly quiescent state does not congeal as rapidly as when under a slight movement, and, moreover, that the ice formed while the water is quiescent is generally cloudy and opaque in appearance owing to the interspersion of innumerable small bubbles in the water.

The object of my invention is to facilitate the formation of ice in natural bodies of water or artificial lakes or ponds by causing the same to circulate or move constantly or intermittently by suitable mechanism, as more fully hereinafter specified. These objects I attain by the mechanism illustrated in the accompanying drawing, which represents a perspective view of my improvement.

The letter A indicates a paddle-wheel mounted on a shaft journaled in suitable bearings, C, and adapted to rotate in a sluice, B, built at one side or any portion of a natural or artificial body of water—such as a lake or pond—and communicating at each end with the same. The shaft is provided with a pulley, D, from which extends a band or other mechanism to a suitable motor whereby the wheel may be rotated. Upon putting the wheel in motion the water will be caused to circulate continuously, as shown by the arrows, the velocity of the wheel being regulated according to the temperature of the weather, being increased as the temperature lowers. It is evident that this circulation or current will carry along any accumulation of gas or air bubbles that may find lodgment against the under surface of the ice and bring fresh water in contact to be frozen.

Having thus described my invention, what I claim, and desire to secure by Letters Patent, is—

1. In its application to a natural or artificial body of water for facilitating the formation of atmospheric or natural ice, a water-circulating wheel suitably mounted and provided with means for rotating it, in combination with a sluice, whereby the water in the pond is made to circulate, substantially as specified.

2. The herein-described method or process of artificially preventing the inclosure of air or gas bubbles in ice naturally formed on or over still water, and improving the quality of the ice by forcing a circulation of water under the ice after its formation has commenced, substantially as set forth.

OSSIAN GUTHRIE.

Witnesses:
A. H. ADAMS,
E. T. BOND.